Patented Mar. 3, 1953

2,630,441

UNITED STATES PATENT OFFICE 2,630,441

ADDITION PRODUCTS

Joachim Dazzi, Dayton, Ohio, assignor to Monsanto Chemical Company, St. Louis, Mo., a corporation of Delaware No Drawing. Application September 25, 1950, Serial No. 186,679

11 Claims. (Cl. 260—404.8)

The present invention relates to new polycarboxylic compounds, and deals more particularly with new adducts of dimeric fatty acids or esters thereof with esters of fumaric acid and to vinyl chloride polymers comprising the new adducts.

Dimeric fatty acids employed for the preparation of the present adducts may be obtained by heating esters of polyunsaturated acids such as linoleic or linolenic acid at high temperatures substantially as described by Bradley and Johnson (Ind. Eng. Chem. 32 802 (1940); 33 86 (1941). The dimeric acids may also be those prepared by dehydrating a hydroxylated higher fatty acid or an ester thereof, e. g., ricinoleic acid or castor oil, to yield a dienic, dicarboxy compound, e. g., such as that described in the U. S. Patents No. 2,325,040 to Cook et al., and No. 2,347,562 to Johnston.

These dimeric, dibasic fatty acids or esters thereof derived from higher unsaturated acids of from 11 to 24 carbon atoms have been reacted in prior art with hydroxyl-containing materials to yield linear superpolyesters (see for example U. S. Patent No. 2,429,219 to Cowan et al.). The materials thus obtained are stated to serve as suitable replacements for natural rubber.

Now I have found that the dimeric, dibasic fatty acids may be converted to an entirely different type of poly-ester. I have found that low-molecular weight esters, having from 4 to 10 carboxy groups and of great value as plasticizing agents for vinyl chloride polymers may be readily obtained by contacting the dimeric acids or their esters with an ester of fumaric acid. The products thus obtained are simple adducts in which one mole of the dimeric, dibasic acid has added to from 1 to 4 moles of the fumarate; they may be represented by the general formula

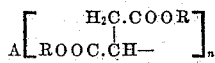

in which A is a dimer derived from a dialkyl or bis(alkoxyalkyl) ester of an unsaturated vegetable oil fatty acid in which each alkyl or alkoxyalkyl radical has from 1 to 8 carbon atoms, R is an alkyl or alkoxyalkyl radical of from 1 to 8 carbon atoms, and $n$ is an integer of from 1 to 4.

Depending upon the reaction conditions and the nature of the individual reactants, there occurs addition of from one to 4 moles of the dicarboxylic component to the dimeric ester compound. Thus, with a dialkyl dilinoleate, there may be obtained 1:1 adducts having the probable general formula:

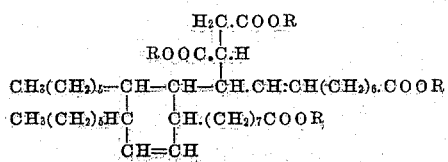

in which R is an alkyl radical of from 1 to 8 carbon atoms. Employing a greater quantity of the fumarate and more stringent reaction conditions, the products may be 1:2 adducts having the probable general formula:

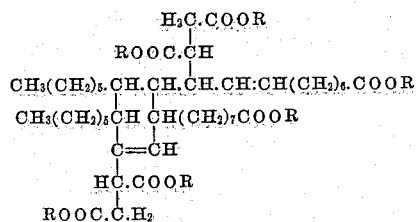

A 3:1 α,β-olefinic dicarboxylic acid — dilinoleic acid adduct may be formed by similar addition of another mole of the former to the 2:1 adduct. A 4:1 adduct is formed by addition to this product. Mixtures of adducts of various ratio are thus obtained.

The present invention provides tetracarboxylic adducts by reaction of one mole of the dimeric ester with one mole of the α,β-olefinic dicarboxylic compound, hexacarboxylic adducts by reaction of one mole of the dimeric ester with 2 moles of the α,β-olefinic dicarboxylic compound, and octacarboxylic compounds by reaction of one mole of the dimeric ester with 3 moles of the α,β-olefinic compound. Because of uncertainty concerning the position at which the dicarboxylic residue is attached to the dimeric compound, the present adducts will be hereinafter referred to without stipulating the position of the introduced carboxy groups; for convenience, however, the introduced carboxy groups will be designated as 1',2'-dicarboxyethyl groups and the products obtained with a dimeric ester such as a dialkyl dilinoleate will be referred to as dialkyl (1',2'-dicarboxyethyl) dilinoleate in case of the 1:1 addition products; as dialkyl bis(1',2'-dicarboxyethyl) dilinoleates for the 1:2 adducts; and as dialkyl tris(1',2'-dicarboxyethyl) dilinoleates in the case of the 1:3 addition product.

In preparing my new fumarate-dimeric ester adducts, I prefer to employ di-esters of fumaric acid with saturated aliphatic, un-substituted alcohols or alkoxy-substituted alcohols of from 1 to 8 carbon atoms, these esters yielding adducts which I find particularly useful as plasticizers. As examples of fumarates which I employ may be mentioned dimethyl fumarate, diethyl fumarate, di-n-propyl fumarate, di-isobutyl fumarate, ditert-amyl fumarate, bis(2-ethylhexyl) fumarate, bis(2-ethoxyethyl) fumarate, bis(3-butoxypropyl) fumarate, etc. The dimeric ester component which I preferably employ is a dialkyl or bis(alkoxyalkyl) ester of a dimer of an unsaturated fatty acid of from 10 to 24 carbon atoms in which each alkyl or alkoxyalkyl radical has from 1 to 8 carbon atoms. As examples of dimeric esters which I employ may be mentioned the dimers of methyl, heptyl, 3-methoxypropyl, or 2-ethoxyethyl ricinoleate and the dimers of propyl, tert-amyl, hexyl, or 2-butoxyethyl linoleate. Depending upon the quantity of the high fumarate adducts which I desire in the final product, I use from 1 to 10 moles of the fumarate per mole of the dimeric ester. I have found that when a molar equivalent of the fumarate per mole of the fatty acid component is employed the product is predominantly a 1:1 adduct. In effecting the reaction I generally prefer to operate as follows:

The fumarate and the dimeric ester are mixed in a reaction vessel in the proportions indicated above and the mixture is heated, usually at atmospheric pressures at temperatures of from 150° C. to 300° C. Pressures of below or above atmospheric may be employed. In some instances, especially when working with the higher fatty acid esters, an inert, high-boiling diluent may be desirable. The temperatures employed are preferably those which do not exceed the decomposition point of the initial reactants. The reaction time may vary from, say, a few hours to several days, a reaction time of, say, from 1 to 3 days being recommended when it is desired to obtain a preponderant yield of products having a greater than 1:1 ratio of fumarate. The product is generally a viscous liquid which comprises a mixture of adducts of varying dicarboxy content and unreacted initial reagents. Any unreacted material may be readily recovered, e. g., by distillation.

The present adducts are stable, high-boiling materials which range from heavy to viscous liquids. They may be advantageously employed for a variety of technical uses, i. e., as intermediates for the preparation of polycarboxylic compounds to be employed for polyamide manufacture, as moisture-proofing agents, lubricant adjuvants, etc.

The present dimeric ester-fumarate adducts are valuable plasticizers for polyvinyl chloride and copolymers of at least 70 per cent by weight of vinyl chloride and up to 30 per cent by weight of an unsaturated monomer copolymerized therewith, for example, vinyl acetate, vinylidene chloride, etc. The present adducts impart great flexibility to vinyl chloride polymers at very low temperatures; they are compatible with such polymers and show no exudation of plasticizer even at plasticizer content of up to 50 per cent. Although the quantity of plasticizer will depend upon the particular polymer to be plasticized and upon its molecular weight, it is generally found that compositions having from 5 per cent to 50 per cent by weight of the present adducts will, in most cases, be satisfactory for general utility. The good flexibility of the plasticized composition increases with increasing plasticizer concentration.

In evaluating plasticizer efficiency use is made of the following empirical testing procedures:

*Compatibility.*—Visual inspection of the plasticized composition is employed, incompatibility of the plasticizer with the polymer being demonstrated by cloudiness and exudation of the plasticizer.

*Hardness.*—A standard instrument made by the Shore Instrument Company is used for this determination and expresses the hardness in units from 1 to 100. The hardness of a composition is judged by its resistance to the penetration of a standard needle applied to the composition under a standard load for a standard length of time.

*Low temperature flexibility.*—Low temperature flexibility is one of the most important properties of elastomeric vinyl compositions. While many plasticizers will produce flexible compositions at room temperature the flexibility of these compositions at low temperatures may vary considerably, i. e., plasticized polyvinyl chloride compositions that are flexible at room temperature often become very brittle and useless at low temperatures. Low temperature flexibility tests herein employed are according to the Clash-Berg method. This method determines the torsional flexibility of a plastic at various temperatures. The temperature at which the vinyl composition exhibits an arbitrarily established minimum flexibility is defined as the low temperature flexibility of the composition. This value may also be defined as the lower temperature limit of the plasticized composition's usefulness as an elastomer.

*Volatility.*—Just as a decrease in low temperature often results in decreased flexibility of a plasticized polymer composition so does a decrease in plasticizer concentration when caused by volatilization of the plasticizer. Hence, plasticizers which are readily volatilized from the plasticized composition as a result of aging or heating are inefficient because upon volatilization the plasticized compositions become stiff and hard. The test for plasticizer volatility herein employed is that described by the American Society for Testing Materials under the designation D-744-44T.

*Water resistance.*—The amount of water absorption and the amount of leaching that takes place when the plasticized composition is immersed in distilled water for 24 hours is determined.

The invention is further illustrated, but not limited, by the following examples:

Example 1

A mixture consisting of 154 g. (0.25 mole) of the diethyl ester of dilinoleic acid and 172.2 g. (1.0) mole of diethyl fumarate was refluxed for 43.5 hours. During this time the boiling point of the mixture rose from 220° C. to 250° C. Heating of the resulting product in a nitrogen atmosphere at a pressure of from 0.2 to 0.5 mm. of mercury to a temperature of 210° C. to remove low-boiling materials (diethyl fumarate) gave as residue 254.5 g. of a viscous, orange liquid, very soluble in methanol and hexane, having a color of 12 on the Gardner scale, and a saponification equivalent of 155.31 which corresponds to the calculated saponification equivalent (152.5) of an adduct of one mole of diethyl dilinoleate with an average of 2.34 moles of diethyl fumarate. The molecular weight of the product, estimated from the weight of the reacted fumarate, is 1020.

Other adducts of a dialkyl or bis(alkoxyalkyl) fumarate and a dialkyl or bis(alkoxyalkyl) ester of a dimeric dibasic acid may be similarly prepared.

Example 2

60 parts of polyvinyl chloride and 40 parts by weight of the adduct of Example 1 were mixed on a rolling mill to a homogeneous blend. During the milling there was observed substantially no fuming and discoloration. A molded sheet of the mixture was clear and transparent and substantially colorless. Testing of the molded sheet for low temperature flexibility, according to the testing procedure described above, gave a value of minus 12° C. Tests on the volatility characteristics of the plasticized composition gave a value of 1.3 per cent, which showed very good retention of plasticizer and indicated good temperature characteristics of the composition. The plasticized material had a hardness of 83 before the volatility test and a hardness of 86 after the volatility test. When subjected to heat at a temperature of 325° F., for a period of 30 minutes the clarity and color of the molded product was substantially unchanged. Tests of the water-resistance properties of the plasticized material employing the testing procedure described above showed a solids-loss of only 0.13 per cent and an 0.40 per cent water absorption value.

The lower ratio adducts of diethyl fumarate and diethyl dilinoleate gave similarly good results. Also, instead of the adduct employed in the above examples, other adducts of dialkyl esters of dimeric fatty acids and dialkyl fumarates in which each alkyl radical has from 1 to 8 carbon atoms gave similarly valuable plasticized polyvinyl chloride compositions. Thus, by employing 40 parts by weight of the adduct of dibutyl or di-n-hexyl fumarate and dimethyl or diamyl dilinoleate with 60 parts by weight of polyvinyl chloride or with 60 parts by weight of a vinyl chloride-vinyl acetate copolymer known to the trade as "Vinylite," there may be obtained clear, colorless compositions of very good flexibility and stability.

Similar testing of the diethyl ester of dilinoleic acid as a plasticizer for polyvinyl chloride showed that the ester was incompatible with the polymer and hence useless as a plasticizer for this purpose.

While the above example shows only compositions in which the ratio of plasticizer to polymer content is 40:60, this ratio being employed in order to get comparable efficiencies the content of ester to polyvinyl chloride may be widely varied, depending upon the properties desired in the final product. For many purposes a plasticizer content of, say, from only 10 per cent to 20 per cent is preferred. The present adducts are compatible with polyvinyl chloride over wide ranges of concentrations, up to 50 per cent of esters based on the total weight of the plasticized composition yielding desirable products.

Although the invention has been described particularly with reference to the use of the present esters as plasticizers for polyvinyl chloride, these esters are advantageously employed also as plasticizers for copolymers of vinyl chloride, for example, the copolymers of vinyl chloride with vinyl acetate, vinylidene chloride, etc. Preferably, such copolymers have a high vinyl chloride content, i. e., a vinyl chloride content of at least 70 per cent by weight of vinyl chloride and up to 30 per cent by weight of the copolymerizable monomer.

The plasticized polyvinyl halide compositions of the present invention have good thermal stability; however, for many purposes it may be advantageous to use known stabilizers in the plasticized compositions. Inasmuch as the present esters are substantially unreactive with the commercially available heat and light stabilizers which are commonly employed with polyvinyl chloride or copolymers thereof, the presence of such materials in the plasticized products does not impair the valuable properties of the present esters. The present esters are of general utility in softening vinyl chloride polymers. They may be used as the only plasticizing component in a compound vinyl chloride polymer or they may be used in conjunction with other plasticizers.

What I claim is:

1. Adducts of one mole of an ester selected from the class consisting of dialkyl and bis-(alkoxyalkyl) esters of a dimeric, unsaturated vegetable oil fatty acid in which each alkyl and each alkoxyalkyl radical has from 1 to 8 carbon atoms and from 1 to 4 moles of a fumarate selected from the class consisting of a dalkyl and bis(alkoxyalkyl) fumarates in which each alkyl radical and alkoxyalkyl radical has from 1 to 8 carbon atoms.

2. Adducts of one mole of a dialkyl ester of a dimeric, unsaturated vegetable oil fatty acid in which each alkyl radical has from 1 to 8 carbon atoms and from 1 to 4 moles of a dalkyl fumarate in which each alkyl radical has from 1 to 8 carbon atoms.

3. Adducts of one mole of a dialkyl dilinoleate in which each alkyl radical has from 1 to 8 carbon atoms and from 1 to 4 moles of a dialkyl fumarate in which each alkyl radical has from 1 to 8 carbon atoms.

4. Adducts of one mole of diethyl dilinoleate and from 1 to 4 moles of a dialkyl fumarate in which each alkyl radical has from 1 to 8 carbon atoms.

5. Adducts of one mole of diethyl dilinoleate and from 1 to 4 moles of diethyl fumarate.

6. The method which comprises contacting an ester selected from the class consisting of dialkyl and bis(alkoxyalkyl) esters of a dimeric, unsaturated vegetable oil fatty acid in which each alkyl and each alkoxyalkyl radical has from 1 to 8 carbon atoms with a fumarate selected from the class consisting of dialkyl and bis-(alkoxyalkyl) fumarates in which each alkyl and each alkoxyalkyl radical has from 1 to 8 carbon atoms and recovering from the resulting reaction product an adduct in which one mole of said fatty acid ester is combined with from 1 to 4 moles of said fumarate.

7. The method which comprises contacting a dialkyl ester of a dimeric unsaturated vegetable oil fatty acid in which each alkyl radical has from 1 to 8 carbon atoms with a dialkyl fumarate in which each alkyl radical has from 1 to 8 carbon atoms and recovering from the resulting reaction product an adduct in which one mole of the dialkyl ester of said fatty acid is combined with from 1 to 4 moles of said fumarate.

8. The method which comprises heating a dialkyl ester of a dimeric unsaturated vegetable oil fatty acid in which each alkyl radical has from 1 to 8 carbon atoms with a dialkyl fumarate in which each alkyl radical has from 1 to 8 carbon atoms and recovering from the resulting reaction product an adduct in which one mole of the dialkyl ester of said fatty acid is combined with from 1 to 4 moles of said fumarate.

9. The method which comprises heating a dialkyl ester of dilinoleic acid with a dialkyl fumarate in which each alkyl radical has from 1 to 8 carbon atoms and recovering from the resulting reaction product an adduct in which one mole of the dilinoleic ester is combined with from 1 to 4 moles of said fumarate.

10. The method which comprises heating diethyl dilinoleate with a dialkyl fumarate in which each alkyl radical has from 1 to 8 carbon atoms and recovering from the resulting reaction product an adduct in which one mole of the linoleate is combined with from 1 to 4 moles of the fumarate.

11. The method which comprises heating diethyl dilinoleate with diethyl fumarate and recovering from the resulting reaction product an adduct in which one mole of the linoleate is combined with from 1 to 4 moles of the fumarate.

JOACHIM DAZZI.

REFERENCES CITED

The following references are of record in the file of this patent:

UNITED STATES PATENTS

| Number | Name | Date |
|---|---|---|
| 2,188,885 | Clocker | Jan. 30, 1940 |
| 2,188,888 | Clocker | Jan. 30, 1940 |
| 2,485,281 | Gregory | Oct. 18, 1949 |
| 2,502,371 | Darby | Mar. 28, 1950 |